(12) United States Patent
Cornwell et al.

(10) Patent No.: US 8,171,318 B2
(45) Date of Patent: May 1, 2012

(54) REPORTING FLASH MEMORY OPERATING VOLTAGES

(75) Inventors: Michael J. Cornwell, San Jose, CA (US); Christopher P. Dudte, San Jose, CA (US); Joseph R. Fisher, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 12/716,153

(22) Filed: Mar. 2, 2010

(65) Prior Publication Data

US 2010/0162012 A1   Jun. 24, 2010

Related U.S. Application Data

(63) Continuation of application No. 11/339,750, filed on Jan. 25, 2006, now Pat. No. 7,702,935.

(51) Int. Cl.
*G06F 1/26* (2006.01)
*G06F 1/32* (2006.01)

(52) U.S. Cl. .................. 713/320; 713/300; 365/189.15; 365/226; 711/100; 711/102; 307/31

(58) Field of Classification Search .................. 713/300, 713/320; 365/189.15, 226; 307/31; 711/100, 711/102

See application file for complete search history.

(56) References Cited

U.S. PATENT DOCUMENTS

| | | | |
|---|---|---|---|
| 4,974,181 A | 11/1990 | Sinderson et al. |
| 5,224,070 A | 6/1993 | Fandrich et al. |
| 5,450,365 A | 9/1995 | Adachi |
| 5,473,753 A | 12/1995 | Wells et al. |
| 5,577,194 A | 11/1996 | Wells et al. |
| 5,592,641 A | 1/1997 | Fandrich et al. |
| 5,602,775 A | 2/1997 | Vo |
| 5,602,987 A | 2/1997 | Harari et al. |
| 5,621,685 A | 4/1997 | Cernea et al. |
| 5,633,824 A | 5/1997 | Onuki |
| 5,671,229 A | 9/1997 | Harari et al. |

(Continued)

FOREIGN PATENT DOCUMENTS

WO   WO 96/17460   6/1996

(Continued)

OTHER PUBLICATIONS

International Preliminary Report on Patentability for Application No. PCT/US2008/061463, dated Nov. 5, 2009, 10 pages.

(Continued)

*Primary Examiner* — Thomas Lee
*Assistant Examiner* — Jaweed A Abbaszadeh
(74) *Attorney, Agent, or Firm* — Fish & Richardson P.C.

(57) ABSTRACT

Apparatus and associated systems, methods and computer program products relate to using information stored in a flash memory to adjust the operating voltage supplied to the flash memory. The voltage information indicates a minimum operating voltage at which to operate the flash memory device. In general, operating a flash memory device near a minimal operating voltage may substantially minimize power consumption. The minimum operating voltage for individual flash memory devices may vary from IC to IC, by manufacturing lot, and by manufacturer. In a product, the minimum operating voltage for a particular flash memory may be determined, for example, by a controller built-in to a flash memory reporting (automatically or in response to a query) the minimum operating voltage (e.g., 2.5 V, 3.15 V) to a memory controller or microprocessor. The stored voltage information may further include information to adjust the operating voltage based on temperature.

20 Claims, 3 Drawing Sheets

U.S. PATENT DOCUMENTS

| | | | |
|---|---|---|---|
| 5,719,808 A | 2/1998 | Harari et al. |
| 5,737,240 A | 4/1998 | Ellsworth |
| 5,848,009 A | 12/1998 | Lee et al. |
| 5,880,996 A | 3/1999 | Roohparvar |
| 6,014,755 A | 1/2000 | Wells et al. |
| 6,052,306 A | 4/2000 | Sedlak et al. |
| 6,075,941 A | 6/2000 | Itoh et al. |
| 6,081,447 A | 6/2000 | Lofgren et al. |
| 6,148,435 A | 11/2000 | Bettman |
| 6,149,316 A | 11/2000 | Harari et al. |
| 6,249,890 B1 | 6/2001 | Ukani et al. |
| 6,260,156 B1 | 7/2001 | Garvin et al. |
| 6,269,025 B1 | 7/2001 | Hollmer et al. |
| 6,304,487 B1 | 10/2001 | Pawletko et al. |
| 6,334,027 B1 | 12/2001 | Fukuoka et al. |
| 6,381,670 B1 | 4/2002 | Lee et al. |
| 6,426,893 B1 | 7/2002 | Conley et al. |
| 6,470,413 B1 | 10/2002 | Ogawa |
| 6,516,381 B1 | 2/2003 | Hamilton et al. |
| 6,567,930 B1 | 5/2003 | Moriya |
| 6,611,907 B1 | 8/2003 | Maeda |
| 6,639,864 B2 | 10/2003 | Sundaram et al. |
| 6,708,289 B1 | 3/2004 | Kudo |
| 6,721,820 B2 | 4/2004 | Zilberman et al. |
| 6,728,913 B1 | 4/2004 | Parker |
| 6,747,827 B1 | 6/2004 | Bassett et al. |
| 6,748,562 B1 | 6/2004 | Krech, Jr. et al. |
| 6,754,765 B1 | 6/2004 | Chang et al. |
| 6,757,842 B2 | 6/2004 | Harari et al. |
| 6,763,424 B2 | 7/2004 | Conley |
| 6,772,276 B2 | 8/2004 | Dover |
| 6,895,464 B2 | 5/2005 | Chow et al. |
| 6,904,506 B2 | 6/2005 | Wu et al. |
| 6,914,846 B2 | 7/2005 | Harari et al. |
| 6,947,332 B2 | 9/2005 | Wallace et al. |
| 6,947,865 B1 | 9/2005 | Mimberg et al. |
| 6,956,769 B2 | 10/2005 | Lee |
| 6,982,919 B2 | 1/2006 | Kumahara et al. |
| 7,013,406 B2 | 3/2006 | Naveh et al. |
| 7,035,159 B2 | 4/2006 | Janzen et al. |
| 7,058,748 B1 | 6/2006 | Jacobs et al. |
| 7,065,689 B2 | 6/2006 | Chiu et al. |
| 7,068,456 B2 | 6/2006 | Walz |
| 7,100,168 B1 | 8/2006 | Wenzl |
| 7,127,622 B2 | 10/2006 | Schnepper |
| 7,137,011 B1 | 11/2006 | Harari et al. |
| 7,161,834 B2 | 1/2007 | Kumahara et al. |
| 7,162,569 B2 | 1/2007 | Conley et al. |
| 7,200,066 B2 | 4/2007 | Krenzke et al. |
| 7,212,463 B2 * | 5/2007 | Zeevi et al. ............ 365/226 |
| 7,237,046 B2 | 6/2007 | Paley et al. |
| 7,237,074 B2 | 6/2007 | Guterman et al. |
| 7,239,557 B2 | 7/2007 | Ha |
| 7,240,219 B2 | 7/2007 | Teicher et al. |
| 7,277,978 B2 | 10/2007 | Khatami et al. |
| 7,278,038 B2 | 10/2007 | Schnepper |
| 7,281,040 B1 | 10/2007 | Ly |
| 7,286,435 B2 | 10/2007 | Odate et al. |
| 7,304,891 B2 | 12/2007 | Kim |
| 7,395,466 B2 | 7/2008 | Dempsey |
| 7,444,490 B2 | 10/2008 | Cases et al. |
| 7,480,792 B2 | 1/2009 | Janzen et al. |
| 7,512,847 B2 | 3/2009 | Bychkov et al. |
| 2002/0156798 A1 | 10/2002 | Larue et al. |
| 2003/0021157 A1 | 1/2003 | Matsubara et al. |
| 2003/0033465 A1 | 2/2003 | Chien et al. |
| 2003/0041295 A1 | 2/2003 | Hou et al. |
| 2003/0111988 A1 | 6/2003 | Sundaram et al. |
| 2003/0131185 A1 | 7/2003 | Dover |
| 2004/0049627 A1 | 3/2004 | Piau et al. |
| 2004/0089717 A1 | 5/2004 | Harrari et al. |
| 2004/0145931 A1 | 7/2004 | Lin et al. |
| 2004/0157638 A1 | 8/2004 | Moran et al. |
| 2004/0172576 A1 | 9/2004 | Yoshii et al. |
| 2004/0174763 A1 | 9/2004 | Schnepper |
| 2004/0250092 A1 | 12/2004 | Hori et al. |
| 2004/0268165 A1 | 12/2004 | May et al. |
| 2005/0083726 A1 | 4/2005 | Auclair et al. |
| 2005/0152202 A1 | 7/2005 | Choi et al. |
| 2005/0188230 A1 | 8/2005 | Bilak |
| 2005/0204187 A1 | 9/2005 | Lee et al. |
| 2005/0226050 A1 | 10/2005 | Crosby |
| 2005/0281112 A1 | 12/2005 | Ito et al. |
| 2006/0005070 A1 | 1/2006 | Zimmer et al. |
| 2006/0010282 A1 | 1/2006 | Kim |
| 2006/0062052 A1 | 3/2006 | Kumahara et al. |
| 2006/0085670 A1 | 4/2006 | Carver et al. |
| 2006/0126415 A1 | 6/2006 | Matarrese et al. |
| 2006/0136900 A1 | 6/2006 | Kim et al. |
| 2006/0142977 A1 | 6/2006 | Oh et al. |
| 2006/0161728 A1 | 7/2006 | Bennet et al. |
| 2006/0195708 A1 | 8/2006 | Kato et al. |
| 2006/0203556 A1 | 9/2006 | Chen et al. |
| 2006/0225073 A1 | 10/2006 | Akagawa et al. |
| 2006/0280019 A1 | 12/2006 | Burton et al. |
| 2007/0008801 A1 | 1/2007 | Chiang et al. |
| 2007/0014176 A1 | 1/2007 | Krenzke et al. |
| 2007/0055843 A1 | 3/2007 | Lameter |
| 2007/0183179 A1 | 8/2007 | Maeda et al. |
| 2008/0086275 A1 | 4/2008 | Astigarraga et al. |
| 2009/0150748 A1 | 6/2009 | Egner et al. |

FOREIGN PATENT DOCUMENTS

| | | |
|---|---|---|
| WO | WO 98/15149 | 9/1998 |

OTHER PUBLICATIONS

K9XXG08UXM—Preliminary Flash Memory—Samsung Electronics, pp. 1-44.

"Common Flash Memory Interface Specification," Release 2.0, Dec. 1, 2001; pp. 1-25.

"17.3 RAIDO-Striping," by T. Rhodes and M. Stokely; FreeBSD Handbook, Chpt 17 GEOM: Modular Disk Transformation Framework; pp. 1-3.

"Two Technologies Compared: NOR vs. NAND White Paper," Jul. 3, 91-SR-012-04-8L, Rev 1.1, pp. 1-14.

"ATA Flash Disk Controller," 2004 Silicon Storage Technology, Inc.; pp. 1-76.

"512M IDS Jan. 27, 2010 8 Bit / 1G IDS Jan. 27, 2010 8 Bit NAND Flash Memory," Flash Memory, Samsung Electronics, pp. 1-38.

"RAID," SearchWinSystems.Com Learning Guide: Backup Solutions, pp. 1-3.

"Advanced Technology Attachment," http://foldoc.doc.ic.ac.uk/foldoc.

"Portalplayer, Inc.—Products," http://www.portalplayer.com/products/indeIDS_1/27/10.html, pp. 1-5.

PCT Invitation to Pay Additional Fees and, Where Applicable, Protest Fee, PCT/US2008/061463, mailed Sep. 11, 2008, (9 pages).

International Search Report and Written Opinions for PCT Application No. PCT/US2008/061463, dated Jan. 30, 2009 18 pages.

Quantum Fireball SE 2.1/3.2/4.3/6.4/8.4 GB AT Product Manual, Oct. 1997, Quantum Corporation, pp. 25-30, 50-60.

* cited by examiner

REPORTING FLASH MEMORY OPERATING VOLTAGES

CROSS-REFERENCE TO RELATED APPLICATIONS

This application claims priority to U.S. patent application Ser. No. 11/339,750 to Cornwell et al., entitled "Reporting Flash Memory Operating Voltages" and filed Jan. 25, 2006, the contents of each are incorporated herein by reference.

TECHNICAL FIELD

Various implementations may relate generally to flash memory devices, and particular implementations may relate to methods and systems for reporting operating voltage information stored in a flash memory device.

BACKGROUND

As computing devices have increased in capabilities and features, demand for data storage devices has grown. Data storage devices have been used, for example, to store program instructions (i.e., code) that may be executed by processors. Data storage devices have also been used to store other types of data, including audio, image, and/or text information, for example. Recently, systems with data storage devices capable of storing substantial data content (e.g., songs, music videos, etc. . . . ) have become widely available in portable devices.

Such portable devices include data storage devices (DSDs) that have small form factors and are capable of operating from portable power sources, such as batteries. Some DSDs in portable devices may provide non-volatile memory that is capable of retaining data when disconnected from the power source. Portable devices have used various non-volatile data storage devices, such as hard disc drives, EEPROM (electrically erasable programmable read only memory), and flash memory.

Flash memory has become a widely used type of DSD. Flash memory may provide a non-volatile memory in portable electronic devices and consumer applications, for example. Two types of flash memory are NOR flash and NAND flash. NOR flash typically provides the capacity to execute code in place, and is randomly accessible (i.e., like a RAM). NAND flash can typically erase data more quickly, access data in bursts (e.g., 512 byte chunks), and may provide more lifetime erase cycles than comparable NOR flash. NAND flash may generally provide non-volatile storage at a low cost per bit as a high-density file storage medium for consumer devices, such as digital cameras and MP3 players, for example.

In a wide array of devices, flash memories draw power from a voltage regulator designed to regulate a voltage to a fixed voltage. In some applications, the voltage supplied to the flash memory may be a convenient value such as 3.3V or 5V, for example.

SUMMARY

Described apparatus and associated systems, methods and computer program products relate to using information stored in a flash memory to adjust the operating voltage supplied to the flash memory. In some implementations, the voltage information includes minimum operating voltage information at which to operate the flash memory device. In general, operating a flash memory device near a minimal operating voltage may substantially minimize power consumption. The minimum operating voltage for individual flash memory devices may vary from IC to IC, by manufacturing lot, and by manufacturer. In a product, the minimum operating voltage for a particular flash memory may be determined, for example, by a controller built into a flash memory reporting (automatically or in response to a query) the minimum operating voltage (e.g., 2.5 V, 3.15 V) to a memory controller or microprocessor. The stored voltage information may further include information to adjust the operating voltage based on temperature.

Some implementations may provide one or more advantages. For example, by discovering what the minimum operating voltage is, a voltage regulator can be adjusted to operate the flash memory at an optimally efficient level (i.e., to tune the voltage regulator to the lowest possible output voltage to operate a flash memory). This feature may enable longer battery life in some implementations by reducing power flash memory power consumption and/or by enabling the battery to be discharged to a lower level, thereby increasing the operating range for battery discharges.

The details of one or more implementations of the invention are set forth in the accompanying drawings and the description below. Other features of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EXAMPLES

Figure 1:
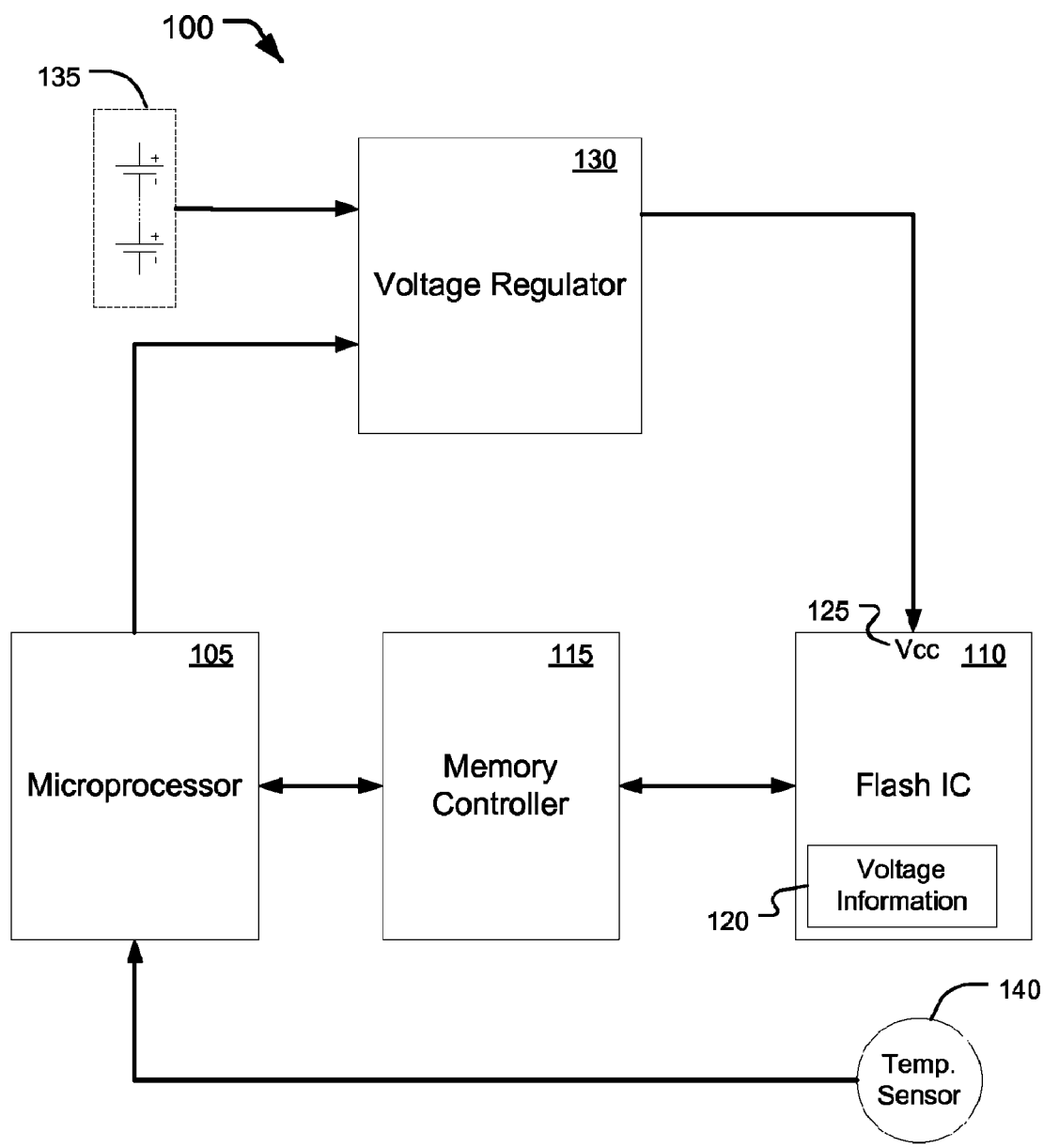
FIG. 1 is a schematic diagram showing an example of a system having voltage information stored in flash memory.

FIG. 1 shows an example of a system 100 in which a predefined operating voltage for flash memory operations may be reported to adjust the voltage supplied to the flash memory during a memory operation. The system 100 may be implemented in various portable devices that use flash memory, such as digital cameras, portable audio devices, personal digital assistants (PDA), and digital video recorders, for example. As an example, the system 100 may use a predefined minimum operating voltage for read operations in the flash memory. In general, battery life may be extended by operating flash memory at a voltage that is as low as practicable.

The system 100 includes a microprocessor 105 and a flash memory IC 110. During operation, the microprocessor 105 may write and/or read data to and/or from the flash memory IC 110 via a memory controller 115. In some implementations, the flash memory IC 110 may include NAND memory cells. In other implementations, the flash memory IC 110 may include NOR memory cells. The memory controller 115 may provide an interface for the microprocessor 105 to control the flash memory IC 110. The memory controller 115 may be, for example, a SST55LD019 ATA flash disc controller, available from Silicon Storage Technology, Inc. of Sunnyvale, Calif. For example, if the microprocessor 105 is configured to access the flash memory IC 110 using an ATA/IDE interface, then the memory controller 115 may serve as a bridge that translates between the ATA/IDE bus and the flash memory IC 110 interface. In some implementations, commands to read data may be received over a bus in substantial compliance with a standard such as ATA (advanced technology attachment), SATA (serial ATA), IDE, or other bus that may be used to transport commands related to accessing a DSD such as a disc drive. The flash memory IC 110 includes one or more registers 120 and a Vcc input 125.

The register 120 may store a variety of information about the operation voltage of the flash memory IC 110. The register 120 may store, for example, a suggested minimum voltage for read operation, a suggested maximum voltage for read operation, a suggested minimum voltage for write operation, and/or a suggested maximum voltage for write operation. In some implementations, a suggested optimal operating voltage for each of at least one operating condition may be stored in the register 120 and/or in other locations in the flash memory IC 110. In some examples, the voltage information stored in the register 120 may be originally stored during some manufacturing process of the flash memory IC 110, and/or may be updated dynamically over the life of the flash memory IC 110. In some implementations, the predefined minimum and maximum operating voltages of the flash memory IC 110 may be determined and recorded, for example, through testing performed in the manufacturing process. The stored voltage information may be adapted over time according to a function (e.g., linear or non-linear) of the number of cycles (e.g., write cycles and/or read cycles) of the flash memory IC, or according to parametric information, such as historical voltage or temperature to which the flash memory IC 110 has been exposed.

The flash memory IC 110 receives operating electrical power from the Vcc input 125. The system 100 includes a voltage regulator 130 that controls the voltage applied to the flash memory IC 110. The voltage regulator 130, which may include a linear regulator, a switch-mode DC-to-DC converter (e.g., buck, boost, buck-boost, SEPIC, Cuk, flyback, forward), and/or a low drop-out regulator (not shown), can receive power from a battery 135. The microprocessor 105 may send a control signal to the voltage regulator 130 to control the voltage (e.g., between about 3 Volt and about 6 Volts, or other voltage range for logic-level operations) applied to the flash memory IC 110.

In some implementations, the microprocessor 105 may receive operating voltage information about the flash memory IC 110 from information stored in the register 120. For example, the microprocessor 105 may send a command to the memory controller 115 to read the voltage information from the register 120. In other implementations, the flash memory may automatically send the voltage information to the memory controller 115, for example, when the flash memory first wakes up (e.g., receives power). Based on the voltage information, the microprocessor 105 may select an optimum operating voltage for read and/or write operations in the flash memory IC 110. Upon receiving a read or a write command, the microprocessor 105 may adjust the voltage regulator 130, by sending a control signal to set the voltage at the Vcc pin 125 at the selected operating voltage. The control signal sent by the microprocessor may be, for example, serial or parallel, and digital or analog (e.g., filtered pulse width modulated signal), and may be directly sent or indirectly sent through other circuitry (e.g., D/A converter, buffers, multiplexer) to provide an appropriate control signal for the voltage regulator 130.

In some implementations, an optimum operating voltage to supply to a flash memory may include a voltage margin above a minimum value required to reliably operate the flash device. Operation may be considered reliable at a voltage if, for example, the device performs within operating specifications identified in a product datasheet and/or specified by the manufacturer of the system 200. The voltage margin may be based on various circuit load dynamics, capacitance, and/or transient response characteristics of the supply. In general, as the disturbance rejection for the voltage being supplied to the flash memory increases, the voltage margin may be lowered. The voltage margin adjustment information may be provided by the manufacturer of the system 200.

Optimal operating voltage information for an individual flash memory device may be stored in the flash memory device, for example, by the flash memory manufacturer or vendor. The voltage margin adjustment information may be stored separately from the voltage information in some implementations. The voltage margin adjustment may be stored, for example, in the flash memory, in another non-volatile memory (not shown), embedded in the control code 275, or used to modify the stored voltage information as a step in the product manufacturing process.

The system 100 includes a temperature sensor 140 that may measure the thermal condition in or around the flash memory IC 110. The microprocessor 105 may check the temperature sensor 140 and adjust the selected operating voltage based on the voltage information of the flash memory IC 110. In some implementations, the microprocessor 105 may adjust the selected operating voltage according to a predetermined formula that is a function of temperature. As an example, the optimum operating voltage to be applied to each flash memory IC may be individually adjusted based on a measurement from the temperature sensor 140, which may be local to the flash memory IC 110. Accordingly, the microprocessor 105 may send an adjusted command to set the output of the voltage regulator 130.

In some implementations, the microprocessor 105 may also determine adjustments to minimum required voltages based on one or more threshold temperatures. The applied adjustment to the minimum required voltage may be based on a comparison of the present temperature information to the one or more threshold values. In such implementations, the formula or the thresholds may be originally determined by the flash memory IC manufacturer based on design information or based on test results generated during manufacturing testing. The formula and/or threshold information for a flash memory IC may be, for example, stored in memory locations within the flash memory IC. To account for temperature-dependent effects, the microprocessor 105 may, for example, select an operating voltage that is slightly higher than the selected operating voltage when the flash memory IC 110 is operating in a low temperature environment, such as below 0° C.

In some implementations, the temperature sensor 140 may be placed internal or external to a housing (not shown) that contains the system 100. Also, in some implementations, more than one temperature sensors may be used. For example, one or more temperature sensors may be located in, around, under, or between each of the flash memory ICs. Some flash memory ICs may implement an internal junction (or other) type of thermal sensor to monitor temperatures in the flash memory ICs for the microprocessor 105.

Figure 2:
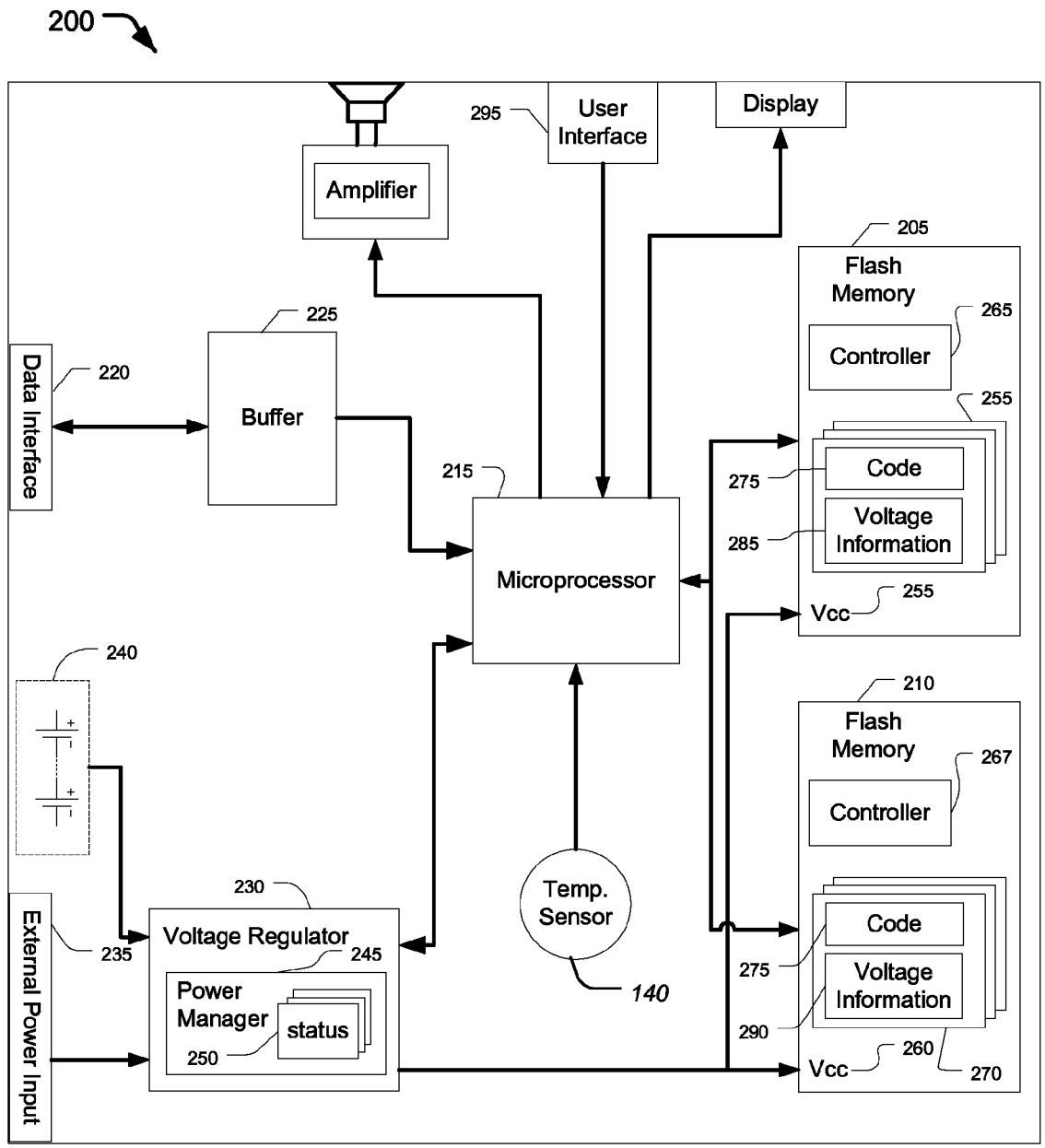
FIG. 2 is a block diagram showing a system including flash memory.

FIG. 2 shows an example of a system 200 that is capable of selecting an operating voltage for a plurality of flash memories 205, 210 based on voltage information stored in the flash memories 205, 210. The system 200 may be, for example, a handheld portable device, such as an MP3 player, cell phone, PDA (portable digital assistant), global positioning system, portable processing device, portable audio/visual recording device, portable video player, or the like. The system 200 is capable of selecting an appropriate operating voltage for read operations and/or an appropriate operating voltage for write operations. In some implementations, the voltage information may be determined and stored in the flash memories 205, 210 during the manufacturing process. In some implementations, the voltage information may be dynamically updated and stored in the flash memories 205, 210.

The system 200 includes a microprocessor 215 and a voltage regulator 220. The microprocessor 215, which directly interfaces the flash memory in this example, may execute read and write commands to access the flash memories 205, 210. The microprocessor 215 can send or receive data through the data interface 220 to an external device. Data being transferred between the data interface 220 and the microprocessor 215 may be stored temporarily in a buffer 225. The signals transferred through the data interface 220 may be data to be transferred to and/or from the flash memories 205, 210, or the data may also be a command for the microprocessor 215. The voltage regulator 230 regulates the voltage applied to the flash memories 205, 210. The voltage regulator 230 may receive power from an external power source 235 or from a battery 240. The voltage regulator 230 may include a power manager 245 that stores electrical status information 250 for the system 200. Monitored status information may include, for example, whether the external power input 235 is connected to a power source, whether the battery 240 is present, and battery voltage information. The voltage regulator 230 receives control signals from the microprocessor 215 to regulate voltage in the system 200. The voltage regulator 230 may also report the electrical status information 250 to the microprocessor 215. The microprocessor 215 may read the electrical status information 250 to select an operating voltage for the flash memories 205, 210.

In some implementations, each flash IC 205, 210 may receive independently controllable supply voltages (e.g., from independently controllable voltage regulators) that are set according to the operating voltage information stored in each individual flash memory IC.

In the implementation of this example, each of the flash memories 205, 210 may draw electrical power from the voltage regulator 230 at their respective Vcc pins 255, 260. Each of the flash memories 205, 210 further includes a controller 265, 267 and a plurality of memory cells 270. The memory cells 270 may be accessed during a read operation performed by the microprocessor 215. The memory cells 205, 210 may further store control code 275 and voltage information 285, 290 respectively. The microprocessor 215 may read the control code 275 and the voltage information 285, 290 to select an optimum operating voltage for the corresponding flash memories 205, 210. The controllers 265, 267 control access to the flash memories 210, 205 respectively. The microprocessor 215 may separately instruct the controllers 265, 267 to report their respective voltage information 285, 290 for the corresponding flash memories 205, 210.

The system 200 of this example also includes a user interface 295, an audio output device, and a display. Users can provide instructions to the system 200 using the user interface 295, such as a touch pad, a keyboard, or an Apple Click Wheel™ input (commercially available from Apple Computer, Inc.), for example. A selected operating voltage may be based, at least in part, on user input. For example, the user may select a battery conservation mode that is designed to maximize battery life. Increasing battery life may suggest, for example, a minimum operating voltage for read and/or write operations. In another example, the user may select a minimum delay mode that is designed to minimize time for memory access operations. Reducing memory access time may suggest, for example, a maximum operating voltage for read operations. Intermediate modes of operation may also be selected, for example, to configure the system 200 to perform fast reads and slow writes, among other combinations and performance levels.

The system 200 may set an operating voltage for reading from and/or writing to the flash memories 205, 210 by the microprocessor 215 executing the code 275. The code 275 may include instructions that, when executed by the microprocessor 215, cause the microprocessor to perform operations to read the voltage information from the flash memories 205, 210, select an operating voltage based on the operating conditions and the operating mode of the system 200, and send the selected operating voltage to the voltage regulator 230.

In various implementations, the system 200 may be implemented in a variety of ways. For example, the system 200 may be configured to have the microprocessor 215 receive the voltage information from the flash memories 205, 210 at different times. The microprocessor 215 may use a variety of techniques to process the received voltage information to select an operating voltage for the flash memory 205, 210. Furthermore, the microprocessor 215 may send a control signal to the voltage regulator 230 at various times in the various implementations.

The process of selecting an operating voltage for the flash memories 205, 210 may be configured to be performed at various times or in response to various conditions. In some implementations, the process of selecting an operating voltage for the flash memories 205, 210 may be performed substantially only once upon first initial commissioning of a product. The microprocessor 215 may also select an operating voltage when it receives a read command or a write command to access the flash memories 205, 210. In other implementations, the process of selecting an operating voltage for the flash memories 205, 210 may be performed on a recurring basis, such as at each boot-up, reset, wake-up, or on a scheduled basis, such as every hour, once a week, etc. Also, the process of selecting an operating voltage for the flash memories 205, 210 may be performed when a maintenance check is initiated on the system 200 when a user issue a maintenance command or when the self-maintenance check on the system 200 is initiated. In other implementations, the microprocessor 215 may select an operating voltage when the operating modes or the operating conditions of the system 200 changes.

In some implementations, the microprocessor 215 may receive the voltage information from the flash memories 205, 210 during initial commissioning of the system 200 (i.e., first power-up). When the system 200 is initially commissioned, the microprocessor 215 may read voltage information 285, 290 from all of the flash memories 205, 210 in the system 200 and store in the non-volatile memory (not shown). During initial commissioning, the microprocessor 215 may access the voltage information 285, 290 to select the flash memory operating voltages in various operating conditions, such as the minimum read and/or write operating voltage in battery life preservation mode, and/or maximum read and/or write operating voltage in minimum delay mode, for example. As another example, the microprocessor 215 may select an operating voltage during a booting process, or when the flash memory is brought into a full operating mode, such as after a reset or wake command, for example.

The microprocessor 215 may also receive the voltage information 285, 290 from the flash memories 205, 210 during system events, such as during a booting process, or when the flash memory is brought into a full operating mode, such as after a reset or a wake command, for example. The microprocessor 215 may read the voltage information during these system events to collect voltage information 285, 290. For example, during a system event, such as a boot process, previously stored voltage information of the flash memories may be lost. The microprocessor 215 may read the voltage information to recover the voltage information and to select an operating voltage for the flash memories 205, 210.

In other implementations, the microprocessor 215 may be configured to receive voltage information in response to a memory access request. For example, the microprocessor 215 may read the voltage information 285, 290 when it receives a read or a write command. As another example, the microprocessor 215 may read the voltage information 285, 290 for every five write commands that the microprocessor 215 has received.

Furthermore, the microprocessor 215 may receive voltage information at request of a user or while system is performing a self-maintenance check. For example, when a user requests the system 200 to update its voltage information, the microprocessor 215 may receive a command to read the voltage information 285, 290 for each of the flash memories 205, 210. As another example, the system 200 may execute a self-maintenance check on a recurring basis. For example, the self-maintenance check for the flash memories 205, 210 may be performed on a recurring basis, such as at each boot-up, reset, wake-up, or on a scheduled basis, such as every hour, once a week, etc. The microprocessor 215 may receive a command to read the flash memories 205, 210 for updated flash memory voltage information during the self-maintenance check.

The microprocessor 215 may also configured to receive voltage information 285, 290 when operating modes or operating conditions change. For example, the microprocessor 215 may read the voltage information 285, 290 when the operating mode of the system 200 is switched from the video playing mode to video downloading mode. As another example, the microprocessor 215 may read the voltage information 285, 290 when a user changes the operating mode of the system 200 from battery life preservation mode to minimum delay mode. The microprocessor 215 may also read the voltage information 285,290 when an operating condition changes. For example, when the battery voltage is low, the microprocessor 215 may read the voltage information 285, 290 from the flash memories 205, 210 to select a lower operating voltage to preserve battery life.

In some implementations, the voltage selection process may include selecting a highest minimum voltage or lowest maximum voltage among all the minimum operating voltages received. For example, if a memory access operation or operating mode involves accessing more than one flash memory IC, i.e., flash memory IC's 205 and 210, then the microprocessor 215 may be configured to read the minimum operating voltage information from each of the flash memory IC's 205 and 210 to identify the highest minimum operating voltage, and then send a control signal to the voltage regulator to supply at least the highest minimum voltage.

The process of setting the operating voltage for the flash memories 205, 210 in the voltage regulator 230 may be configured to be performed at various times. In some implementations, the microprocessor 215 stores the selected operating voltage in a RAM buffer for quick access to respond to a read or write command as they are requested. When the microprocessor 215 receives a read command to access data in the flash memories 205, 210, the microprocessor 215 may send a control signal to the voltage regulator 230 to set, based on the received voltage information, an operating voltage for the flash memories 205, 210 during the memory access operations. In other implementations, the selected operating voltage is stored in the voltage regulator 230 after selection. During memory operations, the voltage regulator 230 may retrieve the selected operating voltage for voltage output. In some implementations, during a read or a write process, the microprocessor 215 may wait for a feedback signal from the voltage regulator 230 before starting to perform the read or write operations. In some implementations, the microprocessor 215 may read the electrical status information 250 and wait until the output operating voltage is the flash memories 205, 210 reaches the highest value selected from among minimum operating voltages. For example, if the largest minimum of read operating voltages is 3.1 volts, and the present operating voltage is 2.5 volts, then the microprocessor 215 may wait until the output voltage of the voltage regulator 230 reaches at least 3.1 volts before start reading the flash memories 205, 210. In other implementations, the voltage regulator 230 may send a signal to the microprocessor 215 to inform the microprocessor 215 that the operating voltage is now valid. Then, the microprocessor 215 may proceed to perform the read or write operation.

Different manufacturers may produce flash memories that have different minimum operating voltages. In an illustrative example, the controllers 265, 267 may report the minimum operating voltage (e.g., 2 ½ V or 3 V). The flash memory controllers 265, 267 may report their respective stored voltage information either automatically or in response to a query from the microprocessor 215. With reference to FIG. 1, the flash memory 110 may report stored voltage information either automatically or in response to a query from the controller 115.

Figure 3:
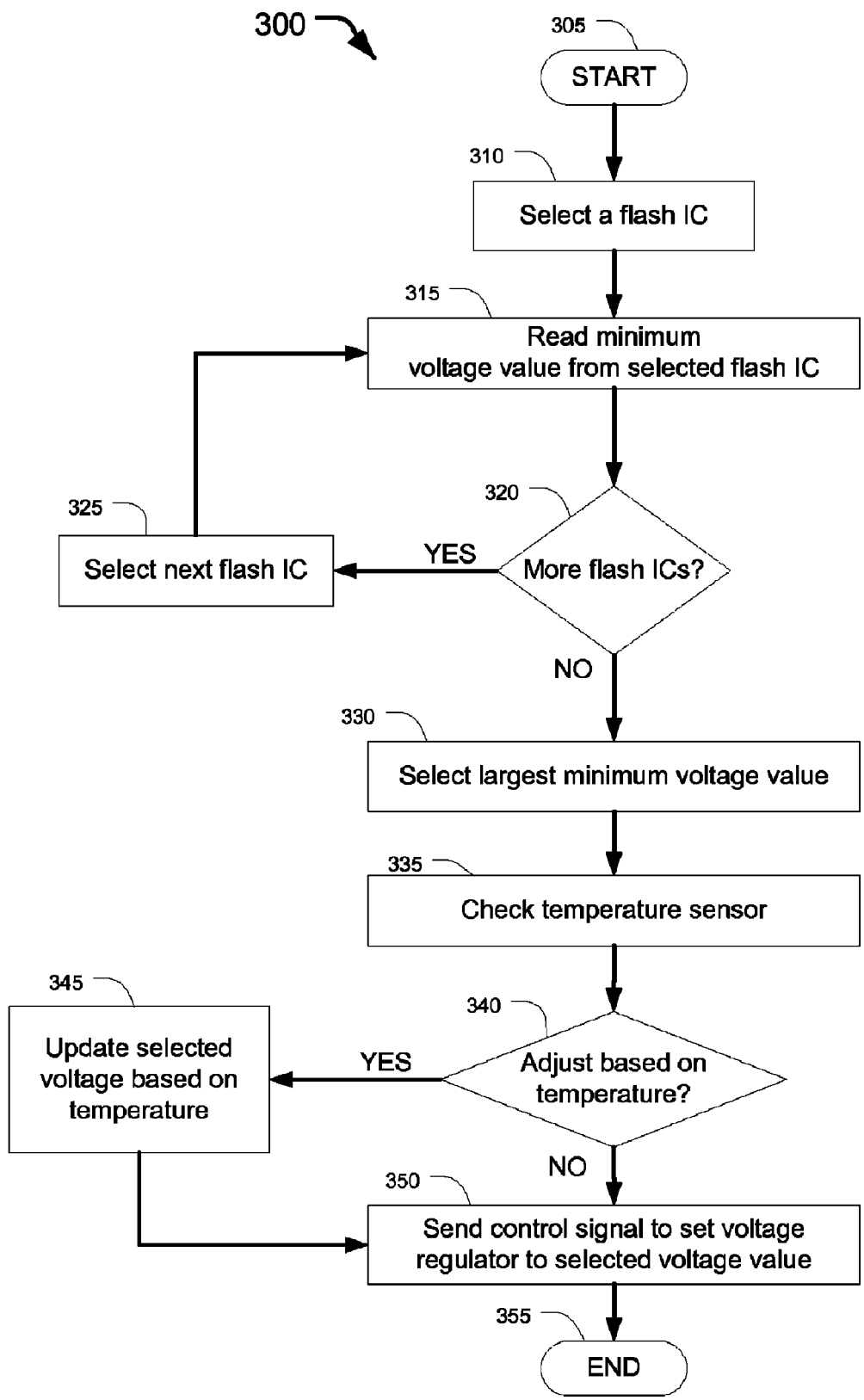
FIG. 3 is a flow diagram illustrating a method to control operating voltage supplied to a flash memory.

In FIG. 3, a flowchart 300 illustrates an example of operations that the microprocessor 215 may perform when executing implementations of the control code 275. The microprocessor 215 may execute the control code 275 to select a suggested minimum operating voltage for the flash memories 205, 210 and to send the appropriate control signal to program the voltage regulator 230 to output the selected operating voltage to the flash memories 205, 210. In this example, the method begins at step 305 when the microprocessor 215 receives a command to read the voltage information stored in the registers in the flash memories 205, 210. For example, the method may begin when the first initializing commissioning of the system 200 is initialized. As another example, the method may begin during a system event such as during a booting process, or after a reset, for example. The method may also begin when the microprocessor 215 receives a read or a write command from a host via the data interface 220. As another example, the method may begin when a maintenance check is initialized by the system 200 or by a user. Furthermore, the method may begin when the microprocessor 215 detects a change in the operating mode or the operating conditions.

In step 310, the microprocessor 215 selects a flash memory IC to check. In step 315, the microprocessor 215 reads the minimum voltage value from the selected flash memory. The microprocessor 215 then, in step 320, determines whether there are more flash memory ICs to check. If there are more flash memory ICs to check, then the microprocessor 215 selects the next flash memory IC in the system 200 at step 325 and repeats step 315.

If, in step 320, there are no more flash memory ICs to check, then the microprocessor 215 selects, in step 330, the largest minimum voltage value from among all the minimum voltage values received from each flash memory IC that was selected. Depending on the operating mode, the code 275 may include instructions to select another operating voltage. For example, in the minimum delay mode, the microprocessor 215 may also select the smallest maximum voltage for the flash memory ICs to minimize delay in memory read and memory write operations.

Next, in step 335, the microprocessor 215 checks the thermal condition near the flash memory ICs using the temperature sensor 140. In step 340, upon receiving the temperature information, the microprocessor 215 may determine whether the selected operating voltage is to be adjusted based on the received temperature information. As described above, thresholds, formulae, or other criteria to make this determination may have been included in the stored voltage information that was retrieved from the selected flash memory. If the microprocessor 215 determines that the selected operating voltage is to be adjusted, then the microprocessor 215 may update the selected voltage based on the temperature information in step 345. Next, the microprocessor 215 may, in step 350, send control signal to set the voltage regulator 230 to the selected voltage value and the method ends at step 355.

If, in step 340, the microprocessor 215 determines that there is no adjustment for the selected operating voltage, then the microprocessor 215 performs step 350 and the method ends at step 355.

Although one implementation of the method has been described, other implementations may perform the steps in different sequence, or a modified arrangement to achieve the same primary function.

Although an example of a system, which may be portable, has been described with reference to the above figures, other implementations may be deployed in other processing applications, such as desktop and networked environments.

Some systems may be implemented as a computer system that can be used with implementations of the invention. For example, various implementations may include digital and/or analog circuitry, computer hardware, firmware, software, or combinations thereof. Apparatus can be implemented in a computer program product tangibly embodied in an information carrier, e.g., in a machine-readable storage device or in a propagated signal, for execution by a programmable processor; and methods can be performed by a programmable processor executing a program of instructions to perform functions of the invention by operating on input data and generating an output. The invention can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system 100 may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. The invention may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system 100 may communicate using suitable communication methods, equipment, and techniques. For example, the system 100 may communicate with compatible devices (e.g., devices capable of transferring data to and/or from the system 100) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A flash memory device, comprising:
   a first plurality of memory cells for storing data;
   a second plurality of memory cells for storing data;
   a voltage input adapted for connection to an output of a voltage-regulated power supply;
   a first register containing information indicating a first minimum operating voltage to supply from the voltage-regulated power supply to the voltage input for performing a read operation on one or more of the first plurality of memory cells;
   a second register containing information indicating a second minimum operating voltage to supply from the voltage-regulated power supply to the voltage input for performing a read operation on one or more of the second plurality of memory cells; and
   a processor configured to i) identify a greatest minimum operating voltage from among the first minimum operating voltage and the second minimum operating voltage, and ii) determine a selected operating voltage to supply from the voltage-regulated power supply to the voltage input for performing the read operation of the one or more of the first plurality of memory cells based upon the identified greatest minimum operating voltage.

2. The flash memory device of claim 1, further comprising:
   a temperature sensor configured to measure a temperature associated with the first plurality of memory cells; and
   wherein the processor is configured to further determine the selected operating voltage to supply from the voltage-regulated power supply to the voltage input for performing the read operation of the one or more of the first plurality of memory cells based upon the temperature measured by the temperature sensor.

3. The flash memory device of claim 1, wherein the processor is further configured to determine the selected operating voltage in response to a start-up of the flash memory device, in response to receiving a read command or a write command for the first plurality of memory cells, or on a recurring basis during operation of the flash memory device.

4. The flash memory device of claim 1, wherein the processor is configured to further determine the selected operating voltage based upon a voltage margin above the greatest minimum operating voltage for reliably operating at least the first memory cells.

5. The flash memory device of claim 4, wherein the voltage margin is based at least in part upon circuit load dynamics associated with at least the first plurality of memory cells.

6. The flash memory device of claim 4, wherein the voltage margin is based at least in part upon a capacitance associated with at least the first plurality of memory cells.

7. The flash memory device of claim 4, wherein the voltage margin is based at least in part upon transient response characteristics associated with the power supply.

8. A method of supplying power to a flash memory device, the method comprising:
   receiving information indicating a first minimum operating voltage to supply from a voltage-regulated power supply to a voltage input for performing a read operation on one or more of a first plurality of memory cells;
   receiving information indicating a second minimum operating voltage to supply from the voltage-regulated power supply to the voltage input for performing a read operation on one or more of a second plurality of memory cells;
   receiving a command to read data that is stored in the first plurality of memory cells of the flash memory device;
   selecting a greatest minimum operating voltage from among the first minimum operating voltage and the second minimum operating voltage;
   setting an output voltage from the voltage-regulated supply to the voltage input for performing the command to read data based upon the received information indicating the first minimum operating voltage and based upon the selected greatest minimum operating voltage; and
   executing the command to read the data using the set output voltage.

9. The method of claim 8, wherein the output voltage is further set based upon a voltage margin above the greatest minimum operating voltage for reliably operating at least the first memory cells.

10. The method of claim 9, wherein the voltage margin is based at least in part upon circuit load dynamics associated with at least the first memory cells.

11. The method of claim 9, wherein the voltage margin is based at least in part upon a capacitance associated with at least the first memory cells.

12. The method of claim 9, wherein the voltage margin is based at least in part upon transient response characteristics associated with the power supply.

13. The method of claim 8, further comprising:
    receiving a temperature measurement associated with the first plurality of memory cells; and
    wherein the output voltage is further set based upon the received temperature measurement.

14. The method of claim 8, wherein setting the output voltage is further performed in response to the flash memory device starting-up or on a recurring basis during operation of the flash memory device.

15. A computer program product tangibly embodied in a machine-readable storage device, the computer program product containing instructions that, when executed, cause a processor to perform operations to supply power to a flash memory device, the operations comprising:
    receiving information indicating a first minimum operating voltage to supply from a voltage-regulated power supply to a voltage input for performing a read operation on one or more of a first plurality of memory cells;
    receiving information indicating a second minimum operating voltage to supply from the voltage-regulated power supply to the voltage input for performing a read operation on one or more of a second plurality of memory cells;
    receiving a command to read data that is stored in the first plurality of memory cells of the flash memory device;
    selecting a greatest minimum operating voltage from among the first minimum operating voltage and the second minimum operating voltage;
    sending a signal to the voltage-regulated supply to supply an output voltage to the voltage input for performing the command to read data, wherein the output voltage is determined based upon the selected greatest minimum operating voltage; and
    executing the command to read the data using the set output voltage.

16. The computer program product of claim 15, wherein the output voltage is further determined based upon a voltage margin above the greatest minimum operating voltage for reliably operating at least the first memory cells.

17. The computer program product of claim 16, wherein the voltage margin is based at least in part upon circuit load dynamics associated with at least the first memory cells.

18. The computer program product of claim 16, wherein the voltage margin is based at least in part upon a capacitance associated with at least the first memory cells.

19. The computer program product of claim 16, wherein the voltage margin is based at least in part upon transient response characteristics associated with the power supply.

20. The computer program product of claim 15, wherein the operations further comprise:
   receiving a temperature measurement associated with the first plurality of memory cells; and
   wherein the output voltage is further determined based upon the received temperature measurement.

* * * * *